Patented Nov. 12, 1935

2,021,027

UNITED STATES PATENT OFFICE 2,021,027

OIL EMULSION

Foster Dee Snell and Cyril S. Kimball, Brooklyn, N. Y.

No Drawing. Application April 2, 1930, Serial No. 441,167

9 Claims. (Cl. 134—24)

This invention relates to oil emulsions; and it comprises as an emulsifying agent a composition comprising an aqueous vehicle containing a plurality of certain mutually stabilizing colloids, such as flour (starch), gum arabic, gum tragacanth and pectin; and it also comprises stable emulsions of various oils, such as mineral oils, essential oils, fatty oils, etc., in said emulsifying agent; such stable emulsions forming the basis of such varied products as automobile polishes, ice cream flavors and the like; and it also comprises a process of compounding said various ingredients; all as more fully hereinafter set forth and as claimed.

In the arts, emulsions are required in many relations and in practice it has been difficult to obtain emulsions of stable character. With each individual emulsifying agent and each individual oil, it is in general necessary to undertake elaborate experiments to obtain completely satisfactory results. No single colloidal emulsifying substance has proved entirely satisfactory for emulsifying a large range of oils of different characteristics.

We have however found that there is a certain cooperative action between emulsifying agents of different classes. So to speak, they stabilize each other in emulsions. The result of the use of a plurality of emulsifying agents of different character is more than the sum of the actions of the bodies severally considered. In emulsifying compositions for general use, we have found it advantageous to have at least two entirely different emulsifying agents and better results are obtained with three and still better with four ingredients.

The reason for this unexpected cooperative effect may be in the mutual stabilizing effect of the various colloids upon each other as well as upon the oil sought to be emulsified. Thus gum tragacanth alone is practically worthless as an emulsifying agent; the gum being so nearly insoluble in water that it tends merely to form a mass of swollen lumps, even after the mixture has been boiled. Formation of thin, uniform solutions is practically impossible. We have, however, found that swollen gum tragacanth in water, upon the addition of a small amount of pectin, or of a soluble gum such as gum arabic is peptized and has good emulsifying properties, even where the pectin is, as it usually is, insufficient of itself to give the water good emulsifying properties. Upon addition of starch or flour, also in small amounts, the emulsifying powers are increased; and so with a further addition of gum arabic. We have found that when an insoluble gum, such as gum tragacanth, is used it is generally advantageous to use a small amount of a soluble gum, such as gum arabic, in connection therewith.

The mutually stabilizing colloids which we have used fall into four general classes and we have found it advantageous to use at least one member from each group. Group 1 comprises carbohydrate substances swelling in water, such as starch, dextrin, flour and glycogen; group 2 comprises such water soluble natural gums as gum arabic, gum senegal, etc., group 3 comprises insoluble or slightly soluble natural gums swelling in water, such as gum karaya and gum tragacanth, and group 4 comprises such vegetable colloids as algin, pectin, etc.

We have found that stable emulsions can be made with any type of oil in suitable proportions, by using these composite emulsifiers. Essential oils, such as orange and lemon oils; mineral oils, such as kerosene and lubricating oils, and fixed oils, such as almond, pine, olive, cotton seed, cod-liver, etc., oils are readily emulsified therewith. There is no necessity of changing the emulsifying agent to suit the oil.

The range of useful products which can be prepared from our emulsifying compositions is large and comprises food products, lotions, polishes, medicines, detergents, disinfectants, etc. Examples will be given of an automobile polish and an ice cream flavor, but these are to be considered as merely illustrating our invention without limiting it.

The compound emulsifying agents of the present invention may be packaged and stored in the dry condition, or solutions in the desired amount of water can be made.

We advantageously mix and grind the various ingredients dry. They may be ground before or after mixing. In a typical embodiment of our invention, we dry mix,

| | Parts |
|---|---|
| Flour | 37 |
| Powdered gum tragacanth | 5 |
| Pectin | 2 |
| Powdered gum arabic | 1 |

This forms a fine white powder which is non-hygroscopic and is perfectly stable. In dissolving this composition in water it is advantageous to soak the powder for several hours, after which it is heated with water nearly to the boiling temperature; mixing well at the same time. When cool, the solution may be diluted to the proper degree. This water solution forms an emulsifying agent. In it, the various things required in the final composition may be emulsified and dissolved. Whatever the oil used, a smooth emulsion results. For general purposes concentrations of emulsifier ranging from 0.6 to 5 ounces (dry weight) per gallon of the emulsion have been found suitable; that is, roughly, from 0.5 to 4 per cent of the emulsifier by weight.

One result of the mixture of the various bodies with water is a great increase in the viscosity of the solution. This increase is much more than additive. For example, in one emulsifying agent containing 3.9 ounces of the above composition in a gallon of water, the Saybolt viscosity at 70° F. was 775 seconds. The viscosities of the individual constituents in aqueous solution was found to be as follows:

|  | Seconds |
|---|---|
| Water | 30.5 |
| 3.24 per cent flour solution | 134 |
| 0.44 per cent powdered gum tragacanth solution | 70.5 |
| 0.175 per cent pectin solution | 35.7 |
| 0.087 per cent gum arabic solution | 30.5 |

It is evident from this table that the viscosity of the mixture is much greater than would be expected.

Any two of the above mentioned ingredients, such as gum tragacanth and pectin, may be used together in an emulsifying composition, but this mixture is improved by the addition of flour. Gum arabic as a constituent is likewise advantageous.

The ratios of the four bodies given in the example ante may be varied widely; but the ratios stated give good results. As indicated by the proportions given, the carbohydrate substance advantageously predominates over the other constituents.

Emulsions may, as stated, be made of many oils and in these emulsions there may be incorporated such other ingredients as may be necessary.

For making a highly satisfactory automobile polish, a solution of 3–5 ounces of the stated composition in a gallon of water may be used as a basis for an emulsion of lubricating oil. With this emulsion may be incorporated an abrasive, such as rotten stone or diatomaceous earth, a wetting agent, such has ethylene glycol or glycerine, and a metallic soap, such as oleate or stearate of aluminum or of calcium. In addition, an antiseptic preservative and an odor-giving liquid are advantageous.

One satisfactory composition for an automobile polish is compounded in the following proportions:—

| Diatomaceous earth | pounds | 2⅓ |
|---|---|---|
| Lubricating oil | do | 9 |
| Ethylene glycol | do | 1⅖ |
| Wheat flour | ounces | 3 |
| Benzoate of soda | do | 1 |
| Amyl acetate | do | 4 |
| Lubricating oil bodied with 2 to 4 per cent of calcium stearate | ounces | 2 |
| Gum tragacanth | do | ⅕ |
| Pectin | do | 1/20 |
| Gum arabic | do | 1/100 |
| Water | pounds | 27½ |

The above composition is stable and has a highly satisfactory cleaning and polishing action. It has a creamy consistency and the abrasive exhibits but slight tendency to settle.

In the above automobile polish the amount of emulsifier employed amounts to roughly 2 per cent of the oil which is emulsified and to about 0.5 per cent of the total composition. It is therefore evident that our emulsifier can be employed for making emulsions in proportions as low as roughly 1 part emulsifier to 50 parts of oil and to 200 parts of the emulsion as a whole.

The automobile polish stated is merely illustrative of one use of the present type of composite emulsifier. The substances used in making the compound emulsifier have food value and the composition may be freely used in making various jellies and food articles. The emulsifier of the present invention may be equally well used for blacking, flavorings, cosmetics, polishes, detergents, lotions, cold creams, sauces, disinfectants, etc. The emulsifier, in fact, is suitable for preparing any liquid, semi-liquid or paste emulsion in which water is the external phase. One outstanding use of the emulsifying agent of the present invention is in preparing the various essential oils used in flavoring. Generally these essential oils are diluted with alcohol, to which there is now some objection.

A useful preparaton under the present invention may be made by emulsifying oil of orange in water carrying the described compound emulsifying agent. Using 5 or 6 ounces of the dry powder per gallon, the solution may be used to make emulsions carrying up to 10 per cent of oil of orange.

A suitable concentration of orange oil to make a satisfactory ice cream flavor, for example, ranges from 2 to 10 per cent. Lemon or almond oils can be used in the same manner.

What we claim is:

1. An emulsifier composition suitable for making aqueous emulsions of oils in proportions by weight of 1 part emulsifier to 50 parts of oil and 40 to 200 parts of the emulsion as a whole, which comprises at least three colloidal substances of different nature selected from groups comprising, a carbohydrate material swelling in water selected from a class consisting of starch, dextrin, glycogen and flour; a water soluble natural gum selected from a class consisting of gum arabic and gum senegal; a natural gum swelling in water selected from a class consisting of gum tragacanth and gum karaya; and a vegetable colloid swelling in water selected from a class consisting of algin and pectin; the carbohydrate material predominating over the remaining constituents of the composition.

2. An aqueous oil emulsion comprising an oil and at least three colloidal substances of different properties selected from groups comprising, a carbohydrate material swelling in water, a natural gum swelling in water, a water soluble natural gum and a vegetable colloid swelling in water, the carbohydrate material predominating over the remaining colloidal substances, the proportion by weight of colloids to oil being of the order of 1 to 50, and the proportion by weight of colloids to the total weight of the composition being of the order of 1 to 200.

3. An aqueous oil emulsion comprising an oil and at least three colloidal substances, selected from groups comprising, a carbohydrate material swelling in water selected from a class consisting of starch, dextrin, glycogen and flour; a natural gum swelling in water selected from a class consisting of gum tragacanth and gum karaya; a water soluble natural gum selected from a class consisting of gum arabic and gum senegal, and a vegetable colloid swelling in water selected from a class consisting of algin and pectin; the carbohydrate material predominating over the remaining colloidal substances and the proportion by weight of said colloidal substances to the total weight of the composition being of the order of 1 to 200.

4. An oil emulsion comprising an oil emulsified in an aqueous solution by certain colloidal substances comprising gum tragacanth, pectin, flour and gum arabic, the flour predominating over the remaining colloidal substances, the proportion by weight of said colloidal substances to oil being of the order of 1 to 50, and the proportion by weight of said colloidal substances to the total weight of the composition being of the order of 1 to 200.

5. An emulsified polishing composition comprising the oil emulsion of claim 2 wherein there is incorporated an inorganic abrasive and a mineral oil bodied with a metal soap selected from a class consisting of the oleates and stearates of aluminum and calcium.

6. An emulsified polishing composition comprising the oil emulsion of claim 3 wherein an inorganic abrasive and a mineral oil bodied with a metal soap selected from a class consisting of the oleates and stearates of aluminum and calcium are also incorporated.

7. An emulsified polishing composition comprising the oil emulsion of claim 4 wherein an inorganic abrasive and a mineral oil bodied with a metal soap selected from a class consisting of the oleates and stearates of aluminum and calcium are also incorporated.

8. An emulsifier composition suitable for making aqueous emulsions of oils which comprises the following substances in about the proportion by weight of, flour 37 parts, powdered gum tragacanth 5 parts, pectin 2 parts and powdered gum arabic 1 part.

9. A polishing composition comprising the following substances in about the proportions by weight of, diatomaceous earth 2⅓ pounds, lubricating oil 9 pounds, ethylene glycol 1⅖ pounds, wheat flour 3 ounces, benzoate of soda 1 ounce, amyl acetate 4 ounces, lubricating oil bodied with 2 to 4 per cent of calcium stearate 2 ounces, gum tragacanth ⅕ ounce, pectin 1/20 ounce, gum arabic 1/100 ounce and water 27½ pounds.

FOSTER DEE SNELL.
CYRIL S. KIMBALL.